(12) United States Patent
Ding et al.

(10) Patent No.: US 11,640,145 B2
(45) Date of Patent: May 2, 2023

(54) ESTABLISHMENT OF LOCATION CORRECTION SYSTEM FOR PROCESSING SEAFOOD TRANSPORTATION DISPLACED BY WIND WAVES AND ANTI-ACCUMULATION DRYING PROCESSING METHOD

(71) Applicant: Zhejiang University of Technology, Hangzhou (CN)

(72) Inventors: Yuting Ding, Hangzhou (CN); Xuxia Zhou, Hangzhou (CN); Shichen Zhu, Hangzhou (CN); Zhigang Ke, Hangzhou (CN); Long Lin, Hangzhou (CN); Yucong Zhang, Hangzhou (CN); FangRui Yu, Hangzhou (CN); Zhaoyong Lin, Hangzhou (CN); Ning Lin, Hangzhou (CN); Xia Xu, Hangzhou (CN)

(73) Assignee: ZHEJIANG UNIVERSITY OF TECHNOLOGY, Hangzhou (CN)

( * ) Notice: Subject to any disclaimer, the term of this patent is extended or adjusted under 35 U.S.C. 154(b) by 282 days.

(21) Appl. No.: 17/017,381

(22) Filed: Sep. 10, 2020

(65) Prior Publication Data
US 2021/0133371 A1 May 6, 2021

(30) Foreign Application Priority Data
Nov. 1, 2019 (CN) .......................... 201911059159.X (51) Int. Cl.
G05B 13/04 (2006.01)
A22C 25/00 (2006.01)
(Continued)

(52) U.S. Cl.
CPC ............ *G05B 13/041* (2013.01); *A22C 25/00* (2013.01); *A22C 29/00* (2013.01); *G06F 30/10* (2020.01);
(Continued)

(58) Field of Classification Search
CPC ........ A22C 25/00; A22C 9/00; G05B 13/041; G06F 30/10; G06F 17/11; G06F 30/28;
(Continued)

(56) References Cited

U.S. PATENT DOCUMENTS 10,221,649 B2    3/2019  Shahri et al.
10,837,701 B2 *  11/2020 Turkyilmaz ............ F26B 3/286
2016/0355546 A1* 12/2016 Ghorbani ................. C11B 1/12

FOREIGN PATENT DOCUMENTS

CN   106021638 A   10/2016
CN   107120911 A    9/2017

OTHER PUBLICATIONS

Zhang, Hang, and Shengxiang Deng. "Numerical simulation of moisture-heat coupling in belt dryer and structure optimization." (ScienceDirect, 2017) Applied Thermal Engineering 127: 292-301. http://dx.doi.org/10.1016/j.applthermaleng.2017.08.071 (Year: 2017).*

(Continued)

*Primary Examiner* — Rehana Perveen
*Assistant Examiner* — Daniel E Miller
(74) *Attorney, Agent, or Firm* — Muncy, Geissler, Olds & Lowe, P.C.

(57) ABSTRACT

Aiming at insufficient drying seafood on-board caused by hull swings, the present invention involves the establishment of location correction system for processing seafood transportation displaced by wind waves and anti-accumulation drying processing method. This invention employs CFD-DEM method to simulate the state and distribution of the material particles modulated by the deflector angle and wind (Continued)

speed. Finally, the optimized rotation angle of deflector and wind speed are obtained where material particles are equally distributed. Meanwhile, the uniform and fast drying of the marine products in the swinging hull are achieved. This invention shows the great advantages of high efficiency, automation and continuity.

10 Claims, 4 Drawing Sheets

(51) Int. Cl.
    *G06F 30/10*     (2020.01)
    *A22C 29/00*     (2006.01)
    *G06F 17/11*     (2006.01)
    *G06F 111/10*     (2020.01)
    *G06F 30/28*     (2020.01)

(52) U.S. Cl.
    CPC .............. *G06F 17/11* (2013.01); *G06F 30/28* (2020.01); *G06F 2111/10* (2020.01)

(58) Field of Classification Search
    CPC ...... G06F 2111/10; G06F 30/17; G06F 30/00; G06F 30/20; G06F 30/18; G06F 30/23; G06F 30/30; G06F 30/327; G06F 30/33; G06F 30/3312; G06F 30/34; G06F 30/36; G06F 30/39; G06F 30/392; G06F 30/394; G06F 30/12
    See application file for complete search history.

(56) References Cited

OTHER PUBLICATIONS

Böhner, M et al. "Improving the airflow distribution in a multi-belt conveyor dryer for spice plants by modifications based on computational fluid dynamics." (ScienceDirect, 2013) Biosystems engineering 115, No. 3: 339-345. http://dx.doi.org/10.1016/j.biosystemseng.2013.03.012 (Year: 2013).*

Zhang, Pengfei, Yanbin Mu, Zhenzhen Shi, Qi Zhang, Mingjun Wei, and Majid Jaberi-Douraki. "Computational fluid dynamic analysis of airflow in belt dryer: effects of conveyor position on airflow distribution." (ScienceDirect, 2017) Energy Procedia 142: 1367-1374. 10.1016/j.egypro.2017.12.521 (Year: 2017).*

Azmir, Jannatul, Qinfu Hou, and Aibing Yu. "Discrete particle simulation of food grain drying in a fluidised bed." (ScienceDirect, 2018) Powder Technology 323: 238-249. https://doi.org/10.1016/j.powtec.2017.10.019 (Year: 2018).*

Zhang, P., Wu, P., Zhang, Q., Shi, Z., Wei, M. and Jaberi-Douraki, M., "Optimization of feed thickness on distribution of airflow velocity in belt dryer using computational fluid dynamics". (ScienceDirect, 2017) Energy Procedia, 142, pp. 1595-1602. 10.1016/j.egypro.2017.12.536 (Year: 2017).*

Azmir, Jannatul. "A CFD-DEM simulation of food grain drying process in a fluidised bed." PhD diss., Monash University, 2018. Online at: <https://bridges.monash.edu/articles/thesis/A_CFD-DEM_simulation_of_food_grain_drying_process_in_a_fluidised_bed/7611590> (Year: 2018).*

* cited by examiner

ESTABLISHMENT OF LOCATION CORRECTION SYSTEM FOR PROCESSING SEAFOOD TRANSPORTATION DISPLACED BY WIND WAVES AND ANTI-ACCUMULATION DRYING PROCESSING METHOD

TECHNICAL FIELD OF THE INVENTION

The present invention relates to on-board processing technology field of seafood after fishing, especially to the establishment of location correction system for processing seafood transportation displaced by wind waves and anti-accumulation drying processing method.

BACKGROUND OF THE INVENTION

Seafood is more susceptible to deterioration due to its enrichment in protein and moisture, especially when they are processed by traditional strategies "fishing at sea+processing on land". Therefore, the on-board immediate drying of seafood is becoming critical to the quality maintenance of its products. The onboard dry technology of seafood can minimize the adverse effects on the quality of seafood, caused by delayed processing periods on land. Hot-air drying is one of the widely used marine on-board dry processing technologies because of its low investment, great adaptability and easy operation. Compared to those technologies used on land, it is noted that more attentions should be paid to onboard dry processing technologies given to its own particularity, including space limitation and sway of hull. More requirements have to be considered for the equipment size due to limitation of hull space. Besides, the processing hull traveling in the sea will periodically swing left and right and swing back and forth under the action of external forces such as wind and waves, resulting in accumulation of materials during dry processing, especially on both sides of the hull. Such uneven production of aquatic products will cause insufficient or excessive drying of some materials, which seriously lower the processing quality of aquatic products. However, the present studies on marine dry technology mainly focus on the combination and optimization of existing onshore drying equipment, without fully considering the particularity of on-board processing conditions. For example, Chinese patent CN107120911A invented rapid drying device of a ship-loaded Antarctic krill powder, consisting of eight systems including feeding system, quick-drying system and through-flow system and so on. The device can realize the rapid drying of the Antarctic krill powder, and significantly improve the processing quality. However, such complex system with large occupied volume is not allowed to employed on the hull with extremely limited space. Additionally, the uneven drying of aquatic products caused by sway of hull is also ignored in this invention. Therefore, the on-board dry processing of marine aquatic products can not simply adopt the hot air drying technology, which is commonly used on the land. It is necessary to invent a technical scheme suitable for on-board drying based on the simulation of marine aquatic products in the actual processing process, which achieve the rapid and uniform drying of seafood.

The coupled simulation technology of computational fluid dynamics (CFD) and discrete element method (DEM) is a very promising solution to problem of gas-solid biphase flow. The CFD-DEM coupled method can accurately simulate the interaction and motion of material particles imposed by airflow field, which can further optimize the design of shipborne drying equipment and finally improve the quality of marine products on board. Presently, CFD-DEM coupling technology has been widely applied in agricultural processing machinery, precision processing, energy exploration and other fields. For example, Chinese patent CN106021638A invented a bubbling fluidized bed modeling method based on bubble and particle random motion through CFD-DEM coupling technology. This method can greatly improve the accuracy of numerical calculation of stochastic models with low load and fast calculation. The U.S. Patent (U.S. Pat. No. 10,221,649, B2) invented a segmented design method for fluid path diversion with different geological structures based on the CFD-DEM coupling technology, which has the advantages of intelligence and high efficiency. It is thereafter that CFD-DEM coupling technology shows great potential to guide and optimize the design of shipborne due to its general applicability and the simulation accuracy.

SUMMARY OF THE INVENTION

This invention aims to establish location correction system for processing seafood transportation displaced by wind waves and anti-accumulation drying processing method. This system optimized by CFD-DEM coupled method shows the great advantages of high efficiency, economy, continuity, uniformity and controllability.

The technical solutions adopted by the present invention for the aims mentioned above are described in details.

The present invention establishes location correction system for processing seafood transportation displaced by wind waves and anti-accumulation drying processing method based on CFD-DEM coupled strategy, which comprises the following steps:

1) Definition and calculation of the boundary parameters of the model: the ranges of wind speed and deflector rotation angle are defined. The deflector rotation angle is defined as the angle between the deflector and the conveyor belt. The minimum rotation angle of the guide plate is 0° when the ship is running smoothly. When the hull reaches the maximum sway angle, the deflector achieves the maximum rotation angle $\theta_l(-\pi/4<\theta<0)$ or $\theta_r(0<\theta<\pi/4)$. The lowest wind speed is $F_s$ when the hull is stable. The maximum wind speed $F_l$ or $F_r$ is applied when the hull reaches the maximum left or right inclination angle, respectively.

2) Design and mesh division of the 3D model of uniform drying system: The 3D model of uniform drying system is designed by AutoCAD software, and its corresponding mesh division is conducted using mesh module of Ansys Workbench. Tetrahedral mesh with the size of 3~8 mm is set.

3) Dynamics simulation of the airflow field: Import the mesh file generated by the Mesh module into the computational fluid dynamics (CFD). The standard k-ε model is selected as turbulence model, which is defined by turbulent viscosity and the hydraulic diameter. The flow field is analyzed via coupled method, and a second-order upwind style is employed as discrete format.

The airflow field dynamics models are shown as the follows:

$$\frac{\partial}{\partial t}(\alpha_g \rho \kappa) + \frac{\partial}{\partial \chi_j}(\alpha_g \rho \vec{\mu}_j \kappa) = \frac{\partial}{\partial \chi_j}\left(\frac{\alpha_g \mu_e}{\sigma_k} \cdot \frac{\partial k}{\partial \chi_j}\right) + \alpha_g G_k - C_D \alpha_g \rho \varepsilon \quad \text{(Formula ①)}$$

$$\frac{\partial}{\partial t}(\alpha_g \rho \varepsilon) + \frac{\partial}{\partial \chi_j}(\alpha_g \rho \vec{\mu}_j \varepsilon) =$$

-continued $$\frac{\partial}{\partial \chi_j}\left(\frac{\alpha_g \mu_e}{\sigma_\varepsilon} \cdot \frac{\partial \varepsilon}{\partial \chi_j}\right) + \frac{\varepsilon}{\kappa}\alpha_g(C_1 G_k - C_2 \rho \varepsilon)$$

$$G_k = \mu_T\left(\frac{\partial \vec{\mu}_i}{\partial \chi_j} + \frac{\partial \vec{\mu}_j}{\partial \chi_j}\right) + \frac{\partial \vec{\mu}_j}{\partial \chi_j}$$

Where $\vec{\mu}_j$, $\vec{\mu}_i$ means velocity component at x, y axis, respectively, $C_D$ is the drag force coefficient of particle group, $\rho$ is air density, $\mu$ represents fluid shear viscosity, $\upsilon$ is kinematic viscosity; $\mu_T$ is turbulent viscosity, $G_k$ is turbulent energy, $\alpha_g$ is the volume fraction of gas, viscosity coefficient $C_\mu$=0.09, other constants $C_1$=1.44, $C_2$=1.92, $\sigma_k$=1.0, $\sigma_\varepsilon$=1.3.

4) Establishment of the material particle model using EDEM: The particle model is constructed by three-dimensional software, which is further imported into the discrete element model software EDEM.

5) Optimization of the simulation parameters: The corresponding simulation time step is determined by calculating the motion severity of the particles to ensure the stability of the iterative calculation of the system. The fixed time step is set between 20% and 40% of the Rayleigh time step.

6) Simulation of movement of materials by the coupled CFD-DEM method: the Hertz-Mindlin non-slip model is used as contact model of the discrete unit. The computational fluid dynamics and the discrete unit are coupled by a Lagrangian model, which is further used to simulate the motion of the material under the different deflector angles and wind speeds, to optimize the processing parameters.

7) Verification of accuracy and practicality of model: The rotation angle of the deflector and wind speed against materials accumulation are optimized by comparing the distribution of material particles in the hull model imposed by inclination of the hull model of 0°~10°. Meanwhile, the mathematical equation between rotation angle ($\theta$) of the deflector, the wind speed (F) and the hull swing angle ($\omega$) is also established (Formula ②) Furthermore, the actual distribution of the material under the optimized conditions is conducted to verify the accuracy of the model.

$$mg\sin\omega = f + \frac{\partial}{\partial x_i}(\rho s(F\cos\theta)^2) \quad \text{(Formula ②)}$$

Where m is the weight of the material, $\omega$ is hull swing angle, f is the friction force on the material, $\rho$ is the fluid density (kg/m$^3$), f is the fan speed, namely the wind speed, m/s, $\theta$ is the rotation angle of the deflector.

In step (1) mentioned above, the automatic response between the rotation angle of the deflector, the fan speed and the sway amplitude of the ship is achieved through the PLC control system. The programmable controller of the control system is connected with the frequency converter, the ship tilt angle sensor, the rotation angle sensor of deflector and the fan speed sensor.

One of the referred seafood is Silver anchovy with the mass of 0.5±0.1 g, characteristics of ellipsoidal shape with major axis of 2.5±0.5 cm and a minor axis of 0.3±0.05 cm. In step 4) mentioned above, A plurality of spherical particles in EDEM are combined to establish the model of the Silver anchovy.

One of the referred seafood is Antarctic krill with the mass of 2±0.5 g, characteristics of major axis of 6±0.5 cm and a minor axis of 0.6±0.1 cm. In step 4) mentioned above, A plurality of spherical particles in EDEM are combined to establish the model of the Antarctic krill.

One of the referred seafood is Acetes chinensis with the mass of 0.6±0.1 g, characteristics of major axis of 3±0.1 cm and a minor axis of 0.4±0.1 cm. In step 4) mentioned above, A plurality of spherical particles in EDEM are combined to establish the model of the Acetes chinensis.

Preferably, in step 7) mentioned above, the actual distribution proportions ($m_a$) of materials in different parts of the conveyor belt are calculated, which is imposed by the optimized deflector rotation angle and wind speed conditions. Furthermore, the accuracy of the model is verified (Formula ③) by the comparison of the actual distribution proportions ($m_a$) with simulation cases ($m_s$). The drying uniformity is confirmed by measuring the moisture content of materials in different parts of the conveyor belt (Formula ④ and ⑤).

$$|m_a - m_s|/m\text{实} < 10\% \quad \text{Formula ③}$$

$$|Q_{l/r/m} - Q_a|/Q_a < 10\% \quad \text{Formula ④}$$

$$Q_a(Q_l + Q_r + Q_m)/3 \quad \text{Formula ⑤}$$

where $Q_l$, $Q_r$, $Q_m$ separately represents in the left, middle and right of the hull; $Q_a$ represents the corresponding averages.

The present invention also involves the uniform drying processing methods against materials accumulation by establishing location correction system for processing seafood transportation displaced by wind waves. The described methods contain some details as follows: The seafood materials are transported on the conveyor belt in the rate of 3~30 m/min and hot-air dried at 50~70° C. The anti-accumulation for seafoods on the shaky conveyor belt is achieved by the airflow field and rotatable deflector set above conveyor belt. The automatic response between the rotation angle of the deflector, the fan speed and the sway amplitude of the ship is achieved through the PLC control system.

One of the referred seafood is Silver anchovy with the mass of 0.5±0.1 g, characteristics of ellipsoidal shape with major axis of 2.5±0.5 cm and a minor axis of 0.3±0.05 cm. The optimized parameters by the location correction system are as follows: The rotation angle of the deflector is $\theta_1$=20°, $\theta_r$=15°, and the wind speed is $F_1$=2 m/s and $F_r$=3 m/s.

One of the referred seafood is Antarctic krill with the mass of 2±0.5 g, characteristics of major axis of 6±0.5 cm and a minor axis of 0.6±0.1 cm. The optimized parameters by the location correction system are as follows: The rotation angle of the deflector is $\theta_1$=23°, $\theta_r$=17°, and the wind speed is $F_1$=1.5 m/s and $F_r$=2.6 m/s.

One of the referred seafood is Acetes chinensis with the mass of 0.6±0.1 g, characteristics of major axis of 3±0.1 cm and a minor axis of 0.4±0.1 cm. The optimized parameters by the location correction system are as follows: The rotation angle of the deflector is $\theta_1$=25°, $\theta_r$=20°, and the wind speed is $F_1$=2.5 m/s and $F_r$=3 m/s.

Compared with the prior art, the advantages of the present invention are as follows:

1) Aiming at insufficient drying seafood caused by hull swings, this invention employs CFD-DEM method to simulate the state and distribution of the material particles under different parameters modulated by the deflector. Finally, the optimized rotation angle of deflector and wind speed are obtained where material particles are equally distributed. Meanwhile, the uniform and fast drying of the marine products in the swinging hull are achieved. This invention shows the great advantages of high efficiency, automation and continuity.

2) This invention also establishes an automatic control system for the rotation angle of the deflector, wind speed and hull swing, whose programmable controller is connected with the frequency converter, the ship tilt angle sensor, the rotation angle sensor of deflector and the fan speed sensor. This invention shows the advantages of economy and automation.

DETAILED DESCRIPTION OF THE INVENTION

The further description of the present invention is made with examples.

Figure 1:
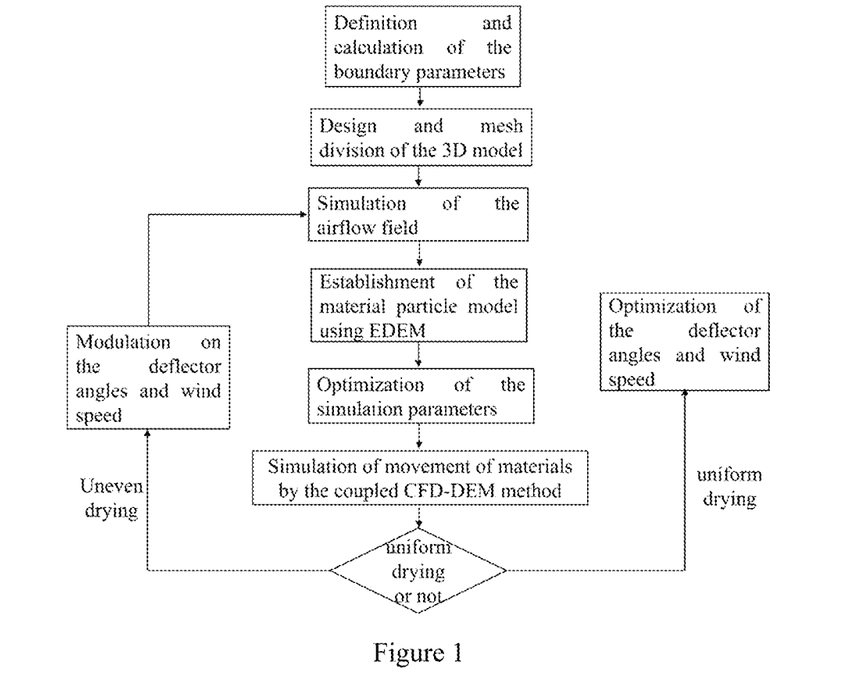
FIG. 1 describes the flow chart of establishment of location correction system for processing seafood transportation displaced by wind waves and anti-accumulation drying processing method.

Example 1: Establishment of location correction system for processing Silver anchovy transportation displaced by wind waves and anti-accumulation drying processing method (FIG. 1).

1) Definition and calculation of the boundary parameters of the model: the angle of rotation of the deflector is defined as the angle between the deflector and the plane of the conveyor belt. When the hull runs smoothly, rotation angle of the deflector reaches the minimum) ($\theta_s=0°$). The rotation angle of the deflector would get the maximum, $\theta_l$ ($-\pi/4<\theta<0$) or $\theta_r$ ($0<\theta<\pi/4$) when the hull reaches the maximum inclination angle. The lowest wind speed, $F_s$, is defined as that one when the hull runs smoothly. The wind speed would reach the highest ($F_l$ or $F_r$) when the hull is in maximum inclination. The automatic response between deflector rotation angle, wind speed and hull sway can be realized through the PLC control systems. The programmable controller of the control system is connected with the frequency converter, the ship tilt angle sensor, the rotation angle sensor of deflector and the fan speed sensor.

Figure 2:
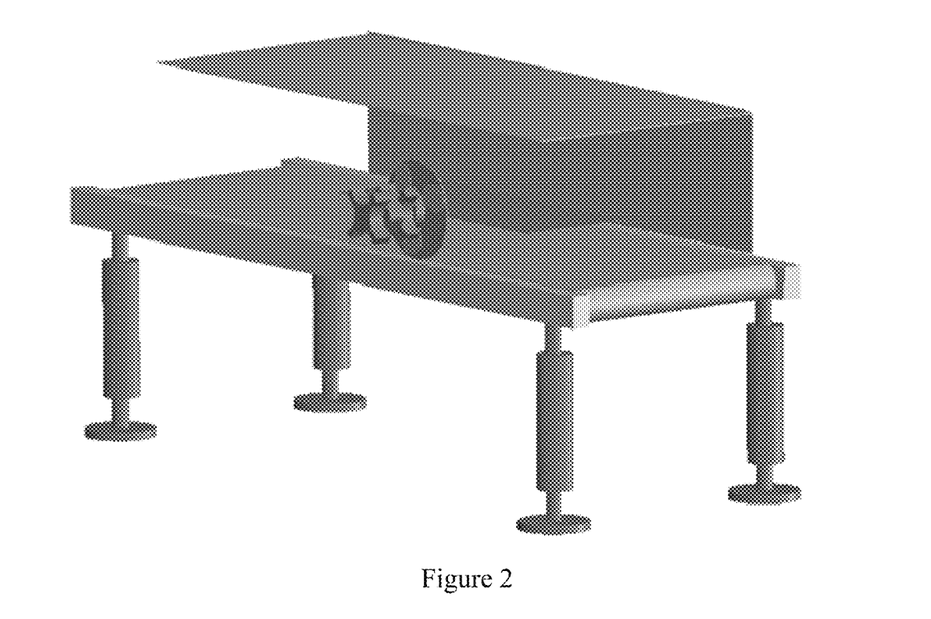
FIG. 2 describes the structure diagram of the uniform drying system.
Figure 3:
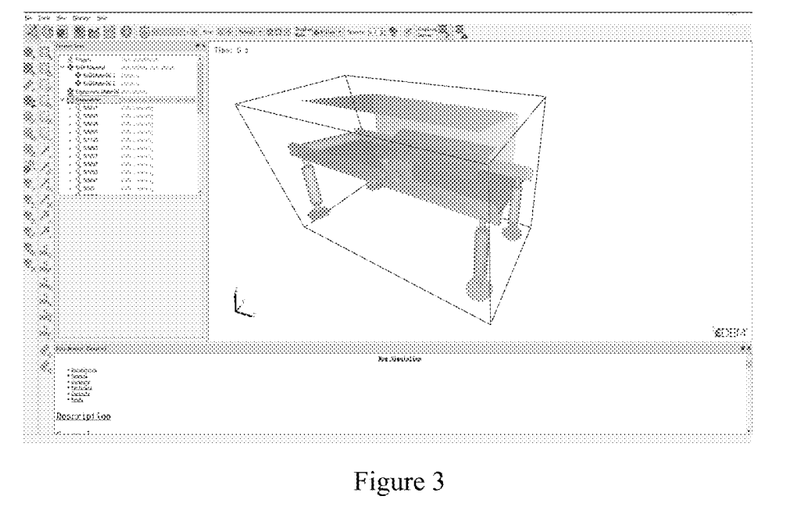
FIG. 3 describes the setting parameters diagram of device geometry imported into discrete element software.
Figure 4:
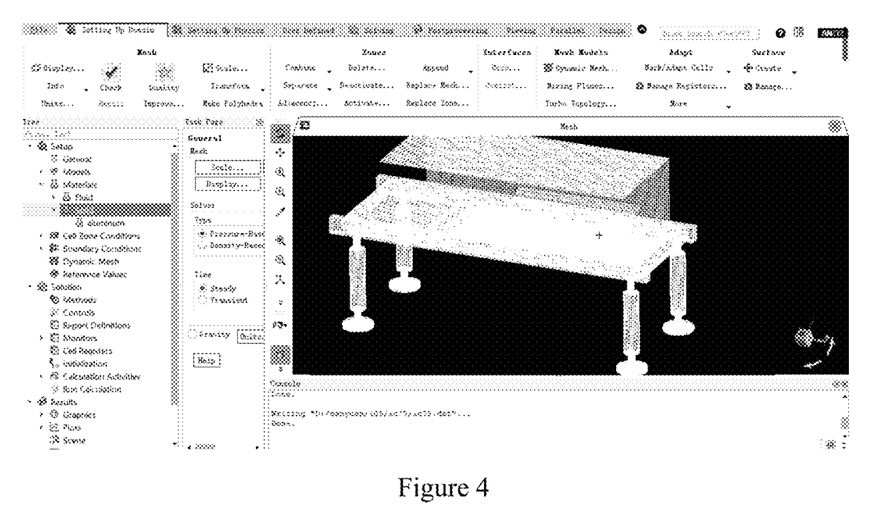
FIG. 4 describes the setting parameters diagram of particle models imported into discrete element software.
Figure 5:
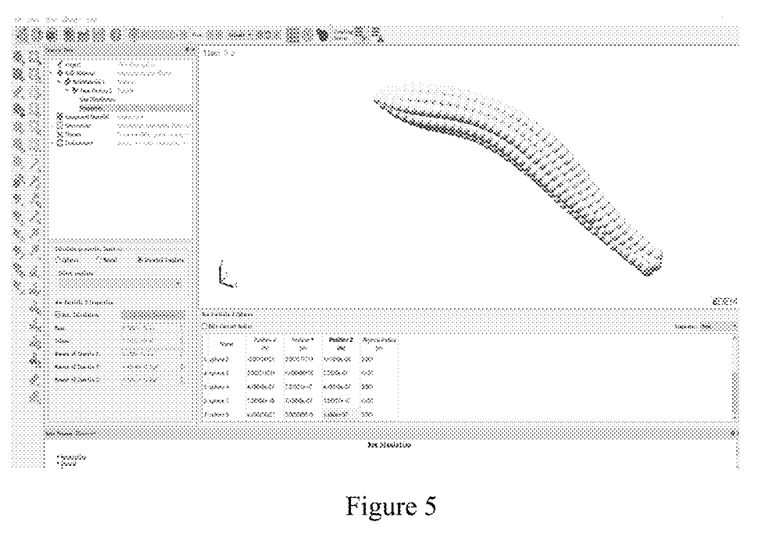
FIG. 5 describes the finite element fluid analysis grid and setting parameter diagram.

2) Design and mesh division of the 3D model of uniform drying system: the 3D model of uniform drying system is designed by AutoCAD software (FIG. 2 and FIG. 3), which is further divided in tetrahedral mesh with the grid size of 4 mm using mesh module of Ansys Workbench (FIG. 4).

3) Simulation of the airflow field: import the mesh file generated by the Mesh module into the computational fluid dynamics (CFD). The standard k-ε model is selected as turbulence model, which is defined by turbulent viscosity and the hydraulic diameter. The flow field is analyzed via COUPLED method, and a second-order upwind style is employed as discrete format.

the used airflow field dynamics models are shown as the follows:

$$\frac{\partial}{\partial t}(\alpha_g \rho \kappa) + \frac{\partial}{\partial \chi_j}(\alpha_g \rho \vec{\mu}_j \kappa) = \frac{\partial}{\partial \chi_j}\left(\frac{\alpha_g \mu_e}{\sigma_k} \cdot \frac{\partial k}{\partial \chi_j}\right) + \alpha_g G_k - C_D \alpha_g \rho \varepsilon$$

$$\frac{\partial}{\partial t}(\alpha_g \rho \varepsilon) + \frac{\partial}{\partial \chi_j}(\alpha_g \rho \vec{\mu}_j \varepsilon) = \frac{\partial}{\partial \chi_j}\left(\frac{\alpha_g \mu_e}{\sigma_\varepsilon} \cdot \frac{\partial \varepsilon}{\partial \chi_j}\right) + \frac{\varepsilon}{\kappa}\alpha_g(C_1 G_k - C_2 \rho \varepsilon)$$

$$G_k = \mu_T\left(\frac{\partial \vec{\mu}_i}{\partial \chi_j} + \frac{\partial \vec{\mu}_j}{\partial \chi_j}\right) + \frac{\partial \vec{\mu}_j}{\partial \chi_j}$$

Where $\vec{\mu}_j$, $\vec{\mu}_i$ means velocity component at x, y axis, respectively, $C_D$ is the drag force coefficient of particle group, ρ is air density, μ represents fluid shear viscosity, υ is kinematic viscosity; $\mu_T$ is turbulent viscosity, $G_k$ is turbulent energy, $\alpha_g$ is the volume fraction of gas, viscosity coefficient $C_\mu=0.09$, other constants $C_1=1.44$, $C_2=1.92$, $\sigma_k=1.0$, $\sigma_\varepsilon=1.3$.

4) Establishment of Silver anchovy model using EDEM: the particle model with the mass of 0.5±0.1 g, characteristics of ellipsoidal shape with major axis of 2.5±0.5 cm and a minor axis of 0.3±0.05 cm, is constructed by three-dimensional software. A plurality of spherical particles in EDEM are combined to establish the model of the Silver anchovy, which is further imported into 5) Optimization of the simulation parameters: the time step is set as $10^{-4}$s, to ensure the stability of the iterative calculation of the system.

Figure 6:
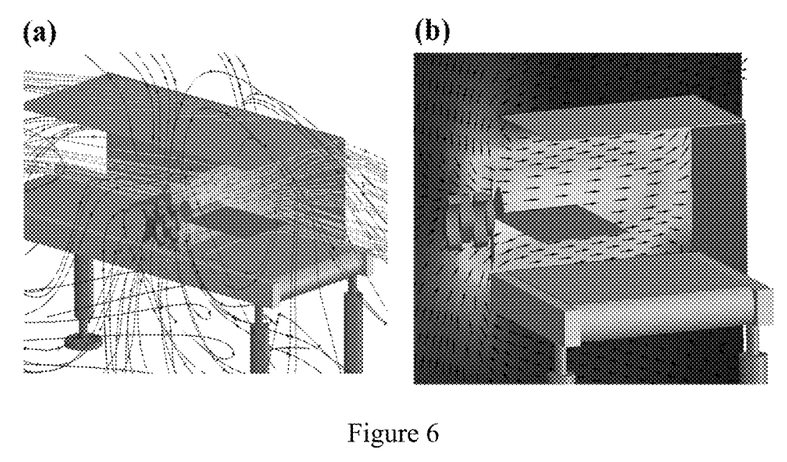
FIG. 6 describes the air flow diagram (a) and air velocity distribution and vector diagram (b) when the hull runs smoothly.
Figure 7:
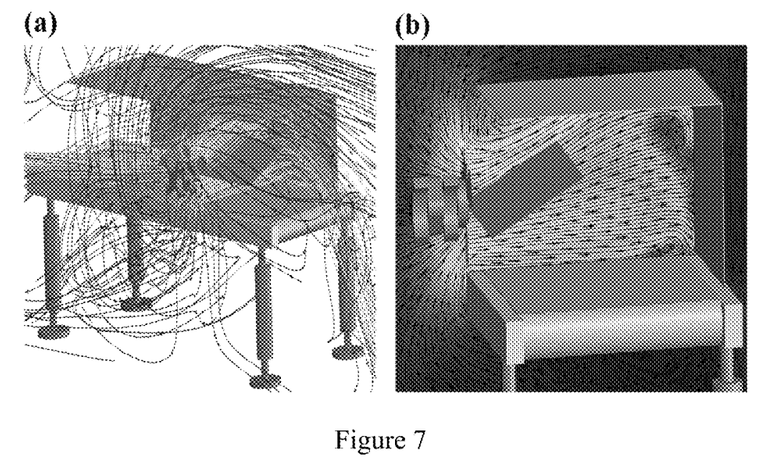
FIG. 7 describes the air flow diagram (a) and air velocity distribution and vector diagram (b) when the hull swing right.
Figure 8:
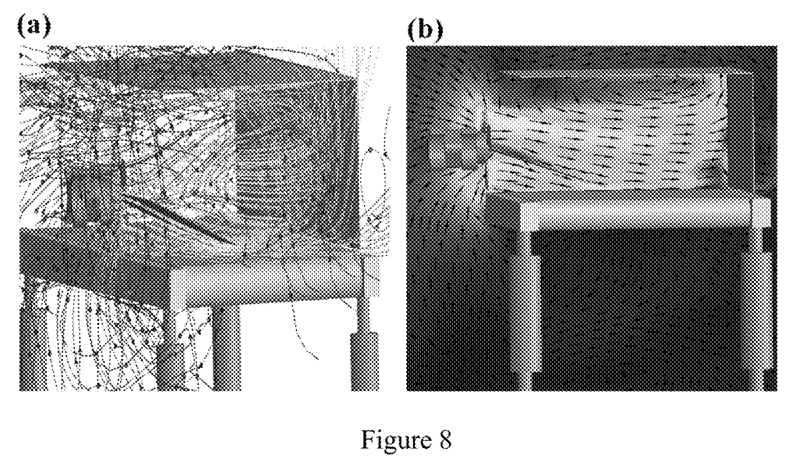
FIG. 8 describes the air flow diagram (a) and air velocity distribution and vector diagram (b) when the hull swings left.

6) Simulation of movement of materials by the coupled CFD-DEM method: the Hertz-Mindlin non-slip model is used as contact model of the discrete unit. The computational fluid dynamics and the discrete unit are coupled by a Lagrangian model, which is further used to simulate the motion of the material under the different deflector angles and wind speeds, to optimize the processing parameters (FIG. 6-FIG. 8).

7) Verification of accuracy and practicality of model: The optimized rotation angle of the deflector ($\theta_l=20°$, $\theta_r=15°$) and wind speed ($F_l=2$ m/s, $F_r=3$ m/s) against materials accumulation are obtained by comparing the distribution of material particles in the hull model imposed by inclination of the hull model of 5°. Furthermore, the errors between actual and simulated distribution of Silver anchovy at the different place of the hull acted by the obtained optimized conditions is less than 10% (Table 1), which confirm the accuracy of the model. Moreover, the moisture content of materials at the left, middle and right of the hull is 28.3%, 26.7% and 23.9% respectively after 30-minute continuous treatment of 60° C. with the transportation rate of 10 m/min. The uniform drying of materials is verified as evidenced by less than 10% differences in moisture between materials at three locations and the corresponding averages (Table 2), which confirm the practicality of model.

TABLE 1

The actual ($m_a$) and simulated (m) distribution of
Silver anchovy at the different places of the hull
acted by the obtained optimized conditions

| Percentage | $\theta_l = 20°$, $F_l = 2$ m/s | | | $\theta_r = 15°$, $F_r = 3$ m/s | | |
|---|---|---|---|---|---|---|
| (%) | Left | Middle | Right | Left | Middle | Right |
| $m_a$ | 40.1 | 32.6 | 28.3 | 33.4 | 30.1 | 37.3 |
| $m_s$ | 39.2 | 31.7 | 30.6 | 32.3 | 28.2 | 40.7 |
| error | 2.5 | 9.4 | 7.1 | 3.0 | 6.7 | 8.1 |

TABLE 2

The moisture content of Silver anchovy, Antarctic krill and
Acetes chinensis in the left ($Q_l$), middle ($Q_m$) and right ($Q_r$) of the hull
and the corresponding averages ($Q_a$)

| Species | $Q_l$ (error %) | $Q_m$ (error %) | $Q_r$ (error %) | $Q_a$ |
|---|---|---|---|---|
| Silver anchovy | 28.3 (7.6%) | 26.7 (1.5%) | 23.9 (9.1%) | 26.3 |
| Antarctic krill | 38.8 (4.0%) | 35.7 (4.3%) | 37.5 (0.5%) | 37.3 |
| Acetes chinensis | 23.9 (7.2%) | 21.3 (4.5%) | 20.6 (7.6%) | 22.3 |

Example 2: Establishment of location correction system for processing Antarctic krill transportation displaced by wind waves and anti-accumulation drying processing method.

1) Definition and calculation of the boundary parameters of the system model: the angle of rotation of the deflector is defined as the angle between the deflector and the plane of the conveyor belt. When the hull runs smoothly, rotation angle of the deflector reaches the minimum) ($\theta_s=0°$). The rotation angle of the deflector would get the maximum, $$\theta_l\left(-\frac{\pi}{4} < \theta < 0\right) \text{ or } \theta_r\left(0 < \theta < \frac{\pi}{4}\right)$$

when the hull reaches the maximum inclination angle. The lowest wind speed, $F_s$, is defined as that one when the hull runs smoothly. The wind speed would reach the highest ($F_1$ or $F_r$) when the hull is in maximum inclination. The automatic response between deflector rotation angle, wind speed and hull sway is realized through the PLC control systems. The programmable controller of the control system is connected with the frequency converter, the ship tilt angle sensor, the rotation angle sensor of deflector and the fan speed sensor.

2) Design and mesh division of the 3D model of uniform drying system: the 3D model of uniform drying system is designed by AutoCAD software, which is further divided in tetrahedral mesh with the grid size of 8 mm using mesh module of Ansys Workbench.

3) Simulation of the airflow field: Import the mesh file generated by the Mesh module into the computational fluid dynamics (CFD). The standard k-ε model is selected as turbulence model, which is defined by turbulent viscosity and the hydraulic diameter. The flow field is analyzed via COUPLED method, and a second-order upwind style is employed as discrete format.

the used airflow field dynamics models are shown as the follows:

$$\frac{\partial}{\partial t}(\alpha_g \rho \kappa) + \frac{\partial}{\partial \chi_j}(\alpha_g \rho \vec{\mu}_j \kappa) = \frac{\partial}{\partial \chi_j}\left(\frac{\alpha_g \mu_e}{\sigma_k} \cdot \frac{\partial k}{\partial \chi_j}\right) + \alpha_g G_k - C_D \alpha_g \rho \varepsilon$$

$$\frac{\partial}{\partial t}(\alpha_g \rho \varepsilon) + \frac{\partial}{\partial \chi_j}(\alpha_g \rho \vec{\mu}_j \varepsilon) = \frac{\partial}{\partial \chi_j}\left(\frac{\alpha_g \mu_e}{\sigma_\varepsilon} \cdot \frac{\partial \varepsilon}{\partial \chi_j}\right) + \frac{\varepsilon}{\kappa} \alpha_g (C_1 G_k - C_2 \rho \varepsilon)$$

$$G_k = \mu_T \left(\frac{\partial \vec{\mu}_i}{\partial \chi_j} + \frac{\partial \vec{\mu}_j}{\partial \chi_j}\right) + \frac{\partial \vec{\mu}_j}{\partial \chi_j}$$

Where $\vec{\mu}_j$, $\vec{\mu}_i$ means velocity component at x, y axis, respectively, $C_D$ is the drag force coefficient of particle group, ρ is air density, μ represents fluid shear viscosity, υ is kinematic viscosity; $\mu_T$ is turbulent viscosity, $G_k$ is turbulent energy, $\alpha_g$ is the volume fraction of gas, viscosity coefficient $C_\mu=0.09$, other constants $C_1=1.44$, $C_2=1.92$, $\sigma_k=1.0$, $\sigma_\varepsilon=1.3$.

4) Establishment of Antarctic krill model using EDEM: the particle model with the mass of 2±0.5 g, characteristics of major axis of 6±0.5 cm and a minor axis of 0.6±0.1 cm, is constructed by three-dimensional software. A plurality of spherical particles in EDEM are combined to establish the model of the Antarctic krill.

5) Optimization of the simulation parameters: the time step is set as $2\times10^{-4}$ s to ensure the stability of the iterative calculation of the system.

6) Simulation of movement of materials by the coupled CFD-DEM method: the Hertz-Mindlin non-slip model is used as contact model of the discrete unit. The computational fluid dynamics and the discrete unit are coupled by a Lagrangian model, which is further used to simulate the motion of the material under the different deflector angles and wind speeds, to optimize the processing parameters.

7) Drying uniformity verification of Antarctic krill: The optimized rotation angle of the deflector ($\theta_l=23°$, $\theta_r=17°$) and wind speed ($F_1=1.5$ m/s, $F_r 2.6$ m/s) against materials accumulation are obtained by comparing the distribution of material particles in the hull model imposed by inclination of the hull model of 9°. Furthermore, the moisture content of materials at the left, middle and right of the hull is 38.8%, 35.7% and 37.5% respectively after 28-minute continuous treatment of 70° C. with the transportation rate of 30 m/min. The uniform drying of materials is verified as evidenced by less than 10% differences in moisture between materials at three locations and the corresponding averages (Table 2), which confirm the practicality of model.

Example 3: Establishment of location correction system for processing Acetes chinensis transportation displaced by wind waves and anti-accumulation drying processing method.

1) Definition and calculation of the boundary parameters of the system model: the angle of rotation of the deflector is defined as the angle between the deflector and the plane of the conveyor belt. When the hull runs smoothly, rotation angle of the deflector reaches the minimum ($\theta_s=0°$). The rotation angle of the deflector would get the maximum, $$\theta_l\left(-\frac{\pi}{4} < \theta < 0\right) \text{ or } \theta_r\left(0 < \theta < \frac{\pi}{4}\right)$$

when the hull reaches the maximum inclination angle. The lowest wind speed, $F_s$, is defined as that one when the hull runs smoothly. The wind speed would reach the highest ($F_1$ or $F_r$) when the hull is in maximum inclination. The automatic response between deflector rotation angle, wind speed and hull sway is realized through the PLC control systems. The programmable controller of the control system is connected with the frequency converter, the ship tilt angle sensor, the rotation angle sensor of deflector and the fan speed sensor.

2) Design and mesh division of the 3D model of uniform drying system: the 3D model of uniform drying system is designed by AutoCAD software, which is further divided in tetrahedral mesh with the grid size of 3 mm using mesh module of Ansys Workbench.

3) Simulation of the airflow field: import the mesh file generated by the Mesh module into the computational fluid dynamics (CFD). The standard k-ε model is selected as turbulence model, which is defined by turbulent viscosity and the hydraulic diameter. The flow field is analyzed via COUPLED method, and a second-order upwind style is employed as discrete format.

the used airflow field dynamics models are shown as the follows:

$$\frac{\partial}{\partial t}(\alpha_g \rho \kappa) + \frac{\partial}{\partial \chi_j}(\alpha_g \rho \vec{\mu}_j \kappa) = \frac{\partial}{\partial \chi_j}\left(\frac{\alpha_g \mu_e}{\sigma_k} \cdot \frac{\partial k}{\partial \chi_j}\right) + \alpha_g G_k - C_D \alpha_g \rho \varepsilon$$

$$\frac{\partial}{\partial t}(\alpha_g \rho \varepsilon) + \frac{\partial}{\partial \chi_j}(\alpha_g \rho \vec{\mu}_j \varepsilon) = \frac{\partial}{\partial \chi_j}\left(\frac{\alpha_g \mu_e}{\sigma_\varepsilon} \cdot \frac{\partial \varepsilon}{\partial \chi_j}\right) + \frac{\varepsilon}{\kappa}\alpha_g(C_1 G_k - C_2 \rho \varepsilon)$$

$$G_k = \mu_T\left(\frac{\partial \vec{\mu}_i}{\partial \chi_j} + \frac{\partial \vec{\mu}_j}{\partial \chi_j}\right) + \frac{\partial \vec{\mu}_j}{\partial \chi_j}$$

Where $\vec{\mu}_j$, $\vec{\mu}_i$ means velocity component at x, y axis, respectively, $C_D$ is the drag force coefficient of particle group, ρ is air density, μ represents fluid shear viscosity, υ is kinematic viscosity; $\mu_T$ is turbulent viscosity, $G_k$ is turbulent energy, $\alpha_g$ is the volume fraction of gas, viscosity coefficient $C_\mu$=0.09, other constants $C_1$=1.44, $C_2$=1.92, $\sigma_k$=1.0, $\sigma_\varepsilon$=1.3.

4) Establishment of Acetes chinensis model using EDEM: the particle model with the mass of 0.6±0.1 g, characteristics of major axis of 3±0.1 cm and a minor axis of 0.4±0.1 cm, is constructed by three-dimensional software. A plurality of spherical particles in EDEM are combined to establish the model of the Acetes chinensis.

5) Optimization of the simulation parameters: the time step is set as $10^{-5}$ s, to ensure the stability of the iterative calculation of the system.

6) Simulation of movement of materials by the coupled CFD-DEM method: the Hertz-Mindlin non-slip model is used as contact model of the discrete unit. The computational fluid dynamics and the discrete unit are coupled by a Lagrangian model, which is further used to simulate the motion of the material under the different deflector angles and wind speeds, to optimize the processing parameters.

7) Drying uniformity verification of Acetes chinensis: The optimized rotation angle of the deflector ($\theta_1$=25°, $\theta_r$=20°) and wind speed ($F_1$=2.5 m/s, $F_r$=3 m/s) against materials accumulation are obtained by comparing the distribution of material particles in the hull model imposed by inclination of the hull model of 7°. Furthermore, the moisture content of materials at the left, middle and right of the hull is 23.9%, 21.3% and 20.6% respectively after 40-minute treatment of 55° C. with the transportation rate of 3 m/min. The uniform drying of materials is verified as evidenced by less than 10% differences in moisture between materials at three locations and the corresponding averages (Table 2), which confirm the practicality of model.

What is claimed:
1. A location correction system for processing seafood transportation vessel displaced by stormy waves, comprising:
a programmable logic controller connected with a ship tilt angle sensor, a fan speed sensor, and a rotation angle sensor of a deflector; the programmable logic controller configured to:
1) define and calculate boundary parameters of a system model, the boundary parameters including wind speed of a fan and a deflector rotation angle, wherein the deflector rotation angle is defined as an angle between a deflector and a conveyor belt, a minimum rotation angle of a guide plate is 0° when the vessel is running without an inclination, wherein when a hull of the vessel reaches a maximum sway angle, the deflector achieves a maximum rotation angle

$$\theta_l\left(-\frac{\pi}{4} < \theta < 0\right) \text{ or } \theta_r\left(0 < \theta < \frac{\pi}{4}\right),$$

wherein a lowest wind speed is $F_s$ when the hull is stable, and a maximum wind speed $F_l$ or $F_r$ is applied when the hull reaches a maximum left or right inclination angle, respectively;

2) design a 3D model of a uniform drying system and conduct a mesh division, wherein a mesh division is conducted by using a tetrahedral mesh with a size of 3 to 8 mm;

3) dynamically simulate an airflow field, wherein a mesh file generated by the mesh division is imported into a computational fluid dynamics (CFD) part of a simulation, a standard k-ε model is selected as a turbulence model which is defined by turbulent viscosity and a hydraulic diameter, the airflow field is analyzed via a coupled CFD-DEM method, and a second-order upwind style is employed as discrete format;

wherein the coupled CFD-DEM method comprises airflow field dynamics models as follows:

$$\frac{\partial}{\partial t}(\alpha_g \rho \kappa) + \frac{\partial}{\partial \chi_j}(\alpha_g \rho \vec{\mu}_j \kappa) = \quad \text{(Formula ①)}$$

$$\frac{\partial}{\partial \chi_j}\left(\frac{\alpha_g \mu_e}{\sigma_k} \cdot \frac{\partial k}{\partial \chi_j}\right) + \alpha_g G_k - C_D \alpha_g \rho \varepsilon$$

$$\frac{\partial}{\partial t}(\alpha_g \rho \varepsilon) + \frac{\partial}{\partial \chi_j}(\alpha_g \rho \vec{\mu}_j \varepsilon) =$$

$$\frac{\partial}{\partial \chi_j}\left(\frac{\alpha_g \mu_e}{\sigma_\varepsilon} \cdot \frac{\partial \varepsilon}{\partial \chi_j}\right) + \frac{\varepsilon}{\kappa}\alpha_g(C_1 G_k - C_2 \rho \varepsilon)$$

$$G_k = \mu_T\left(\frac{\partial \vec{\mu}_i}{\partial \chi_j} + \frac{\partial \vec{\mu}_j}{\partial \chi_j}\right) + \frac{\partial \vec{\mu}_j}{\partial \chi_j}$$

where $\vec{\mu}_j$, $\vec{\mu}_i$ means velocity component at x, y axis, respectively, $C_D$ is a drag force coefficient of a particle group, ρ is air density, μ represents fluid shear viscosity, υ is kinematic viscosity; $\mu_T$ is turbulent viscosity, $G_k$ is turbulent energy, $\alpha_g$ is a volume fraction of gas, viscosity coefficient $C_\mu$=0.09, other constants $C_1$=1.44, $C_2$=1.92, $\sigma_k$=1.0, $\sigma_\varepsilon$=1.3;

4) establish a material particle model by using a discrete element model software, wherein the particle model is constructed by a three-dimensional software, which is further imported into the discrete element model software;

5) optimize simulation parameters, wherein a corresponding simulation time step is determined by calculating a motion severity of particles to ensure stability of iterative calculation of the system, wherein a fixed time step is set between 20% and 40% of Rayleigh time step;

6) simulate a movement of materials by the coupled CFD-DEM (computational fluid dynamics and discrete element method) method; wherein a Hertz-Mindlin non-slip model is used as a contact model of a discrete element method part of the simulation, the computational fluid dynamics part of the simulation and the discrete element method part of the simulation are coupled by a Lagrangian model, which is further used to simulate the movement of the materials under the different deflector rotation angles and wind speeds, to optimize processing parameters; and 7) verify accuracy and practicality of the system model, wherein conditions of the deflector rotation angle and wind speed are optimized against materials accumulation by comparing a distribution of material particles in a hull model imposed by inclination of the hull model of 0° to 10°, and meanwhile, a mathematical equation between a given deflector rotation angle (θ), a given wind speed (F) and a given hull swing angle (ω) is also established in Formula ②, and an actual distribution of a material under the optimized conditions is conducted to verify the accuracy of the system model;

$$mg\sin\omega = f + \frac{\partial}{\partial x_i}(\rho s(F\cos\theta)^2) \quad \text{(Formula ②)}$$

wherein m is the weight of the material, ω is hull swing angle, f is the friction force on the material, ρ is the fluid density (kg/m³), F is the wind speed, namely the wind speed, m/s, θ is the deflector rotation angle;

8) optimize an actual deflector rotation angle and an actual wind speed to equally distribute the actual material particles, whereby uniform and fast drying of seafood materials in a swinging hull are achieved.

2. The system according to claim 1, wherein a seafood material of the seafood materials is Silver anchovy with the mass of 0.5±0.1 g, characteristics of ellipsoidal shape with major axis of 2.5±0.5 cm and a minor axis of 0.3±0.05 cm, and wherein in step 4), a plurality of spherical particles are combined to establish the material particle model of the Silver anchovy.

3. The system according to claim 1, wherein a seafood material of the seafood materials is Antarctic krill with the mass of 2±0.5 g, characteristics of major axis of 6±0.5 cm and a minor axis of 0.6±0.1 cm, and wherein in step 4), a plurality of spherical particles are combined to establish the material particle model of the Antarctic krill.

4. The system according to claim 1, wherein a seafood material of the seafood materials is Acetes chinensis with the mass of 0.6±0.1 g, characteristics of major axis of 3±0.1 cm and a minor axis of 0.4±0.1 cm, and wherein in step 4), a plurality of spherical particles are combined to establish the material particle model of the Acetes chinensis.

5. The system according to claim 1, wherein in step 7), the actual distribution ($m_a$) of the material in different parts of the conveyor belt are calculated, which is imposed by the optimized conditions of the deflector rotation angle and wind speed; furthermore, the accuracy of the system model is verified (Formula ③) by a comparison of the actual distribution ($m_a$) with simulation distribution ($m_s$), the drying uniformity is confirmed by measuring the moisture content of the material in different parts of the conveyor belt (Formula ④ and ⑤);

$$|m_a - m_s|/m_{实} < 10\% \quad \text{Formula ③}$$

$$|Q_{l/r/m} - Q_a|/Q_a < 10\% \quad \text{Formula ④}$$

$$Q_a(Q_l + Q_r + Q_m)/3 \quad \text{Formula ⑤}$$

where $Q_l$, $Q_r$, $Q_m$ separately represents in the left, middle and right of the hull; $Q_a$ represents the corresponding averages.

6. The system according to claim 1, wherein the seafood materials are transported on the conveyor belt in a rate of 3 to 30 m/min and hot-air dried at 50 to 70° C., wherein the uniform and fast drying for the seafood materials on the conveyor belt is achieved by the airflow field and a rotatable deflector is set above the conveyor belt, wherein an automatic response between the actual deflector rotation angle, the actual wind speed of the fan and the sway amplitude of the swinging hall is achieved through a programmable logic control system, wherein the programmable logic control system is connected with a frequency converter, a ship tilt angle sensor, a rotation angle sensor of deflector and a fan speed sensor.

7. The system according to claim 1, wherein the size of the deflector is 1 m×0.5 m, and the size of the conveyor belt is 2.2 m wide and 16.5 m long.

8. The system according to claim 7, wherein the rotation angle of the deflector is $\theta_l=20°$, $\theta_r=15°$, and the wind speed is $F_l=2$ m/s and $F_r=3$ m/s.

9. The system according to claim 7, wherein the rotation angle of the deflector is $\theta_l=23°$, $\theta_r=17°$, and the wind speed is $F_l=1.5$ m/s and $F_r=2.6$ m/s.

10. The system according to claim 7, wherein the rotation angle of the deflector is $\theta_l=25°$, $\theta_r=20°$, and the wind speed is $F_l=2.5$ m/s and $F_r=3$ m/s.

* * * * *